(12) United States Patent
Kim

(10) Patent No.: US 8,588,946 B2
(45) Date of Patent: Nov. 19, 2013

(54) PORTABLE DEVICES FOR PROVIDING ACOUSTIC SOURCE INFORMATION, APPARATUSES FOR PROVIDING ACOUSTIC SOURCE INFORMATION, AND METHODS OF PROVIDING ACOUSTIC SOURCE INFORMATION

(75) Inventor: Jeong-Ho Kim, Seongnam (KR)

(73) Assignee: KT Corporation, Kyeonggi-do (KR)

( * ) Notice: Subject to any disclaimer, the term of this patent is extended or adjusted under 35 U.S.C. 154(b) by 1662 days.

(21) Appl. No.: 11/902,414

(22) Filed: Sep. 21, 2007

(65) Prior Publication Data

US 2008/0125174 A1    May 29, 2008

(30) Foreign Application Priority Data

Nov. 23, 2006 (KR) .......................... 10-2006-0116311

(51) Int. Cl.
*H04L 9/32* (2006.01)

(52) U.S. Cl.
USPC ........................................... 700/94; 381/337

(58) Field of Classification Search
None
See application file for complete search history.

(56) References Cited

U.S. PATENT DOCUMENTS

| | | | |
|---|---|---|---|
| 5,619,383 | A | 4/1997 | Ngai |
| 6,389,055 | B1 | 5/2002 | August et al. |
| 2003/0174861 | A1 | 9/2003 | Levy et al. |
| 2004/0139474 | A1* | 7/2004 | Carro .......................... 725/112 |
| 2006/0239503 | A1* | 10/2006 | Petrovic et al. ............... 382/100 |

FOREIGN PATENT DOCUMENTS

| | | |
|---|---|---|
| KR | 10-2006-0007707 | 1/2006 |
| KR | 10-2006-0020114 | 3/2006 |
| KR | 10-2006-0061992 | 6/2006 |

OTHER PUBLICATIONS

Office Action dated Jan. 16, 2008 for corresponding Korean Application No. 10-2006-0116311.

* cited by examiner

*Primary Examiner* — Julio J Maldonado
*Assistant Examiner* — Mohammad Choudhry
(74) *Attorney, Agent, or Firm* — Harness, Dickey & Pierce P.L.C.

(57) ABSTRACT

Disclosed are portable devices having function for providing information and contents related to various kinds of acoustic sources, apparatuses for providing acoustic source information, and methods for providing acoustic source information. The portable device includes characteristic code extractor and controller. The characteristic code extractor receives acoustic source to divide the acoustic source into audio signal with audio frequency band and signal with supersonic frequency band, and extracts characteristic code of the audio signal with the audio frequency band from the signal with the supersonic frequency band. The controller transmits the characteristic code to acoustic information server, and outputs the acoustic source information corresponding to the characteristic code that is provided from the acoustic information server. Therefore, the acoustic source information can be provided without separate procedure for storing or processing various kinds of acoustic sources as well as music, and the process for providing acoustic source information is simpler.

17 Claims, 7 Drawing Sheets

PORTABLE DEVICES FOR PROVIDING ACOUSTIC SOURCE INFORMATION, APPARATUSES FOR PROVIDING ACOUSTIC SOURCE INFORMATION, AND METHODS OF PROVIDING ACOUSTIC SOURCE INFORMATION

RELATED APPLICATION

The present application claims priority to a Korean paten application No. 2006-0116311 filed on Nov. 23, 2006 in the Korean Intellectual Property Office (KIPO), the entire contents of which are hereby incorporated by reference.

BACKGROUND OF THE INVENTION

1. Field of the Invention

The present invention relates to portable devices, and more particularly to portable devices for providing acoustic source information, which can provide information and contents which are related to the acoustic source, apparatuses for providing acoustic source information, and methods for providing acoustic source information.

2. Description of the Prior Art

As a mobile communication technique has been evolved through generations thereof, and communication and broadcasting are merged with each other, application services such as high speed mobile Internet, video telephone, digital multimedia broadcasting, etc. have been commercialized, in addition to a conventional voice call-oriented mobile communication service.

Furthermore, the function of application provided by a portable device has been gradually varied due to the rapid development of processor techniques and signal processing techniques.

For example, when a camera included in a portable device focuses on a two-dimension code which is printed on a paper or displayed on a monitor of a computer, the portable device can be directly connected with wireless Internet contents corresponding to the two-dimension code without additional operation so that a bell sound, a background screen, a call connection sound (or color ring), a game, a moving picture, etc. can be downloaded to the portable device, or alternatively services such as shopping, advance purchase, etc. can be used by the portable device. As such, a hot code function for performing the above-described operation is implemented in the portable device and a hot code service is provided by mobile communication companies.

In addition, portable devices, which have a function for recording an outer acoustic source to transmit the recorded outer acoustic source to a server where acoustic source information is stored, and have a function for downloading the acoustic source information about the outer acoustic source so as to display the acoustic source information, has recently appeared.

Korea Patent Application Publication No. 2006-61992 (entitled "Method and system for providing music analysis service using multimodal interface") discloses a method and a system for providing a music analysis service. According to the Korea Patent Application Publication No. 2006-61992, when a music recognition application program loaded in a mobile communication device is executed so that the music from which the user wants to get music information is recorded, and the recorded music data are transmitted to a music analysis server via a mobile communication network, the music analysis server receives the recorded music data via the mobile communication network so as to analyze the recorded music data, extracts music information related to the recorded music, and provides the music information such as the title of the recorded music, the name of the singer thereof, etc. and the list of contents related to the recorded music to the mobile communication device.

However, in the Korea Patent Application Publication No. 2006-61992, music has to be recorded in a mobile communication device in order to obtain the music information, thereby increasing the process time corresponding to the period of time taken for recording music, and when music is recorded under an environment having noises, the quality of the recorded music is degraded. Therefore, it is difficult to accurately analyze the music. Furthermore, the information which can be provided is limited to music so that information related to various acoustic sources cannot be provided.

Also, in the Korea Patent Application Publication No. 2006-61992, recorded music data are transmitted to a music analysis server via a mobile communication network, and the music analysis server performs a process for extracting characteristics of the transmitted music data so as to extract an identifier used for searching for information related to the recorded music, searches for music information database by using the extracted identifier, and extracts music information related to the recorded music. Therefore, there is a disadvantage in that the process for providing the music information is too complicated, and the load of the music analysis server increases.

SUMMARY OF THE INVENTION

Accordingly, the present invention has been made to solve the above-mentioned problems occurring in the prior art, and the first feature of the present invention is to provide portable devices that can easily provide acoustic source information and contents related to various kinds of acoustic sources.

The second feature of the present invention is to provide apparatuses that can easily provide acoustic source information and contents related to various kinds of acoustic sources.

The third feature of the present invention is to provide methods of easily providing acoustic source information and contents related to various kinds of acoustic sources in a portable device.

In some example embodiments, a portable device having a function for providing an acoustic source information includes: a characteristic code extractor configured to receive an acoustic source to divide the acoustic source into an audio signal with an audio frequency band and a signal with a supersonic frequency band, the characteristic code extractor extracting a characteristic code of the audio signal with the audio frequency band from the signal with the supersonic frequency band; and a controller configured to transmit the characteristic code to an acoustic information server, and configured to output the acoustic source information corresponding to the characteristic code that is provided from the acoustic information server. The acoustic source may include the audio signal with the audio frequency band and the signal with the supersonic frequency band having the characteristic code used for distinguishing one audio signal with the audio frequency band from another audio signal with the audio frequency band. The characteristic code extractor may include: a high pass filter for separating the signal with the supersonic frequency band from the acoustic source; and a binary code extractor for extracting the characteristic code having a binary logic value from the signal with the supersonic frequency band. The signal with the supersonic frequency band may be in a range from about 20 kHz to about 50 kHz. The acoustic source information may include supplementary contents information related to the acoustic source. The portable device may further include an acoustic source input unit for receiving the acoustic source. The portable device may further include a broadcasting receiver for receiving a digital broadcasting signal via an antenna to provide an audio signal of the digital broadcasting signal to the characteristic code extractor. The audio signal of the digital broadcasting signal may include a first signal with the audio frequency band and a second signal with the supersonic frequency band having a characteristic code used for distinguishing the first signal with the audio frequency band from another audio signal with the audio frequency band.

In other example embodiments, the apparatus for providing an acoustic source information to the portable device receives a characteristic code of an acoustic source from the portable device, searches for the acoustic source information corresponding to the characteristic code of the acoustic source, and provides the searched acoustic source information to the portable device. The acoustic source may include an audio signal with an audio frequency band and a signal with a supersonic frequency band, and the characteristic code of the acoustic source may be used for distinguishing one audio signal with the audio frequency band from another audio signal with the audio frequency band. The apparatus may include an acoustic information database configured to store the acoustic source information corresponding to the characteristic code of the acoustic source; and an acoustic information server configured to receive the characteristic code of the acoustic source from the portable device, configured to search for the acoustic source information corresponding to the characteristic code of the acoustic source in the acoustic information database, and configured to provide the searched acoustic source information to the portable device. The acoustic source information server may provide supplementary contents information related to the acoustic source to the portable device.

In still other example embodiments, an apparatus for providing an acoustic source information to the portable device receives an acoustic source from the portable device, divides the acoustic source into an audio signal with an audio frequency band and a signal with a supersonic frequency band, extracts a characteristic code of the audio signal with the audio frequency band from the signal with the supersonic frequency band, searches for the acoustic source information corresponding to the characteristic code of the acoustic source, and provides the searched acoustic source information to the portable device. The apparatus may include an acoustic information database configured to store the acoustic source information corresponding to the characteristic code of the acoustic source; and an acoustic information server configured to receive an acoustic source from the portable device, configured to divide the acoustic source into the audio signal with the audio frequency band and the signal with the supersonic frequency band, configured to extract the characteristic code of the audio signal with the audio frequency band from the signal with the supersonic frequency band, configured to search for the acoustic source information corresponding to the characteristic code of the acoustic source, and configured to provide the searched acoustic source information to the portable device.

In still other example embodiments, a method of providing an acoustic source information in a portable device include receiving an acoustic source including an audio signal with an audio frequency band and a signal with a supersonic frequency band; and extracting a characteristic code of the audio signal with the audio frequency band from the signal with the supersonic frequency band. The method may further include: transmitting the characteristic code to an acoustic information server via a communication network; and outputting the acoustic source information corresponding to the characteristic code received from the acoustic source information server via the communication network. The method may further include executing supplementary contents information when the acoustic source information includes the supplementary contents information. The method may further include dividing the acoustic source into the signal with the supersonic frequency band and the audio signal with the audio frequency band.

In still other example embodiments, a method for providing an acoustic source information in an apparatus for providing the acoustic source information to a portable device include: receiving a characteristic code of an acoustic source from the portable device; searching for the acoustic source information corresponding to the characteristic code of the acoustic source; and providing the searched acoustic source information to the portable device. The acoustic source may include an audio signal with an audio frequency band and a signal with a supersonic frequency band, and the characteristic code of the acoustic source may be used for distinguishing one audio signal with the audio frequency band from another audio signal with the audio frequency band. The searching for the acoustic source information corresponding to the characteristic code of the acoustic source may include: providing a database including at least one acoustic source information corresponding to a predetermined characteristic code; and searching for the acoustic source information corresponding to the characteristic code of the acoustic source in the database.

In still other example embodiments, a method for providing an acoustic source information in an apparatus for providing the acoustic source information to a portable device include: receiving an acoustic source including a signal with a supersonic frequency band and an audio signal with an audio frequency band from the portable device; extracting a characteristic code of the audio signal with the audio frequency band from the signal with the supersonic frequency band; searching for the acoustic source information corresponding to the characteristic code; and providing the searched acoustic source information to the portable device. Therefore, the acoustic source information related to an acoustic source can be provided without separate procedure for storing or processing various kinds of acoustic sources as well as music, and the acoustic source information is provided by using a characteristic code having one to one correspondence with the acoustic source so that a process for providing acoustic source information is simpler.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
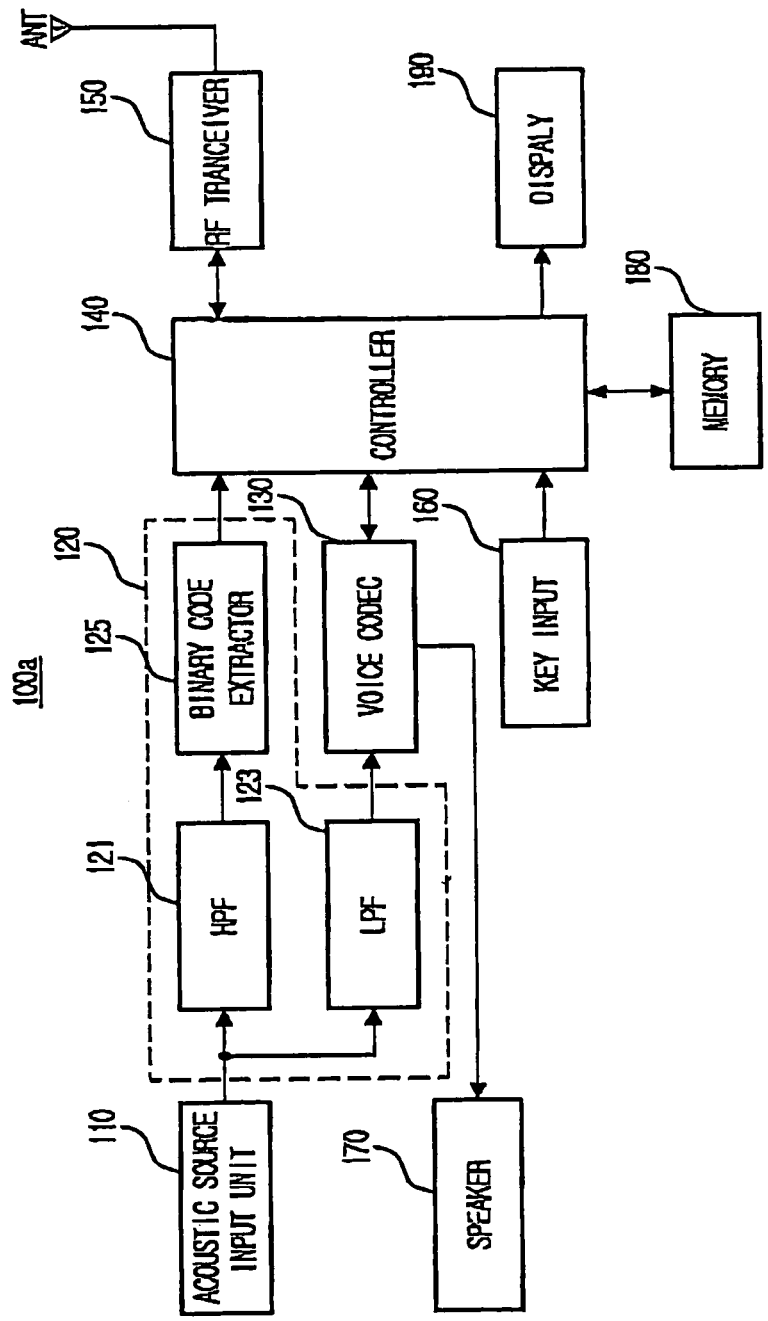
FIG. 1 is a block diagram illustrating a portable device having a function for providing acoustic source information according to an example embodiment of the present invention.

The present invention can have various modifications and various embodiments thereof. Hereinafter, specific embodiments will be illustrated in the accompanying drawings and will be described in detail.

However, the present invention is not limited in the specific embodiments thereof. Therefore, those skilled in the art will appreciate that all modifications, equivalents thereof, and substitutions, which are included in the scope and spirit of the invention, are possible.

Hereinafter, an exemplary embodiment of the present invention will be described in detail with reference to the accompanying drawings. In the following description and drawings, the same reference numerals are used to designate the same or similar components, and so repetition of the description on the same or similar components will be omitted.

Furthermore, the terms "the first" and "the second" can be used in order to illustrate various elements, but the elements must not be limited by the terms. The terms are used only to distinguish one element from another element. For example, without departing from the scope of the invention, the first element can be designated as the second element, and similarly, the second element can be designated as the first element. The term "and/or" includes a combination of a plurality of related items or one of a plurality of related items.

Figure 2:
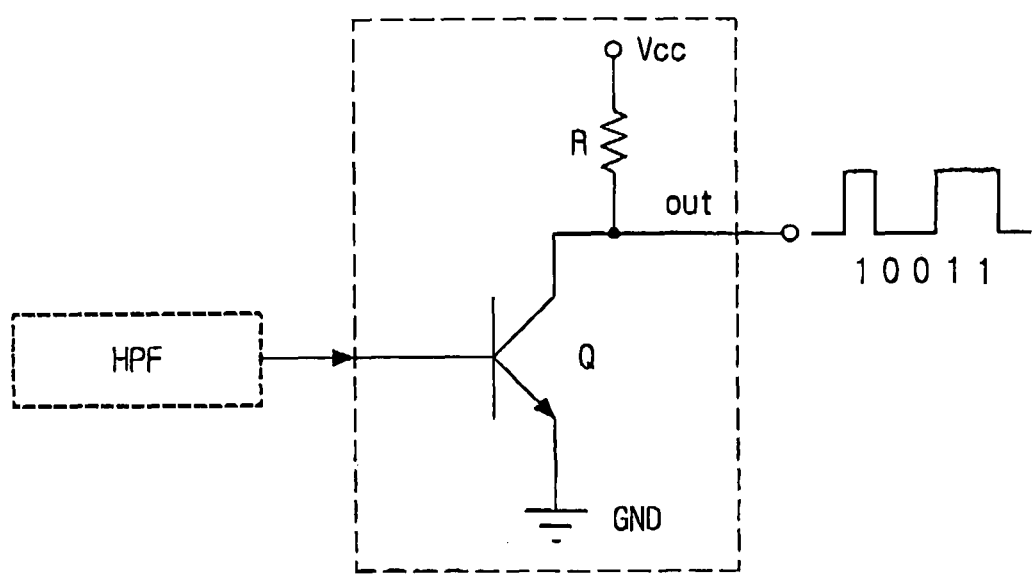
FIG. 2 is a circuit diagram illustrating a binary code extractor of the portable device shown in FIG. 1.

FIG. 1 is a block diagram illustrating a portable device having a function for providing acoustic source information according to an example embodiment of the present invention, and FIG. 2 is a circuit diagram illustrating a binary code extractor of the portable device shown in FIG. 1.

Referring to FIGS. 1 and 2, a portable device 100a having a function for providing acoustic source information according to an example embodiment of the present invention includes an acoustic source input unit 110, a characteristic code extractor 120, a voice codec 130, a controller 140, an RF transceiver 150, a key input 160, a speaker 170, a memory 180, and a display 190. Furthermore, the characteristic code extractor 120 includes a High Pass Filter (HPF) 121, a Low Pass Filter (LPF) 123, and a binary code extractor 125.

The acoustic source input unit 110 receives an outer acoustic source, converts the outer acoustic source to an electric signal corresponding to the received outer acoustic source, and provides the electric signal to the characteristic code extractor 120. The outer acoustic source includes all audio signals with an audio frequency band (e.g. about 20 Hz through about 20 kHz), such as music, voice, sound of nature, audio signal of TV broadcasting signal, etc, which can be recognized by a human's auditory sense. For example, the acoustic source input unit 110 may be implemented as a microphone.

Furthermore, the acoustic source input into the acoustic source input unit 110 includes signals with a supersonic frequency band (e.g. about 20 kHz through about 50 kHz) which cannot be recognized by human's auditory sense. There is a one-to-one correspondence between the signals with the supersonic frequency band and the audio signals with the audio frequency band, and the signals with the supersonic frequency band represents ID codes (or characteristic codes) of respective audio signals with the audio frequency band.

In an example embodiment of the present invention, it is assumed that the acoustic source input into the acoustic source input unit 110 includes an audio signal with an audio frequency band together with a standardized characteristic code with the supersonic frequency band. The standardized characteristic code with the supersonic frequency band is used for distinguishing one audio signal with the audio frequency band from another audio signal with the audio frequency band.

Particularly, the acoustic source input unit 110 receives an acoustic source, in which an audio signal with an audio frequency band is mixed with a signal with a supersonic frequency band, which indicates a characteristic code of the audio signal with the audio frequency band. The acoustic source input unit 110 converts the received acoustic source to an electric signal corresponding to the acoustic source, and provides the electric signal to the characteristic code extractor 120.

Based on the electric signal corresponding to the acoustic source provided from the acoustic source input unit 110, the characteristic code extractor 120 divides the electric signal into an audio signal with an audio frequency band and a signal with a supersonic frequency band, and extracts a characteristic code having a binary logical value from the signal of the supersonic frequency band.

The characteristic code extractor 120 includes the HPF 121, the LPF 123, and a binary code extractor 125. The HPF 121 extracts a signal with a supersonic frequency band from the electric signal corresponding to the acoustic source provided by the acoustic source input unit 110, and provides the extracted signal with supersonic frequency band to the binary code extractor 125.

The LPF 123 extracts a signal with an audio frequency band from the electric signal corresponding to the acoustic source provided by the acoustic source input unit 110, and provides the extracted signal with the audio frequency band to the voice codec 130.

The binary code extractor 125 is provided with the signal with the supersonic frequency band from the HPF 121 and extracts a binary code corresponding to the signal with the supersonic frequency band, i.e. a characteristic code having a binary logical value.

As shown in FIG. 2, the binary code extractor 125 may include a transistor (Q) having an emitter, a base, and a collector node and a resistor (R) connected between the collector node of the transistor (Q) and a power source (Vcc).

When the signal with the supersonic frequency band, which is provided from the HPF 121, is input into the base node of the transistor (Q), an operation of turning-on or turning-off the transistor (Q) is performed according to the amplitude of the signal (e.g. the amplitude of voltage). When the transistor (Q) is turned on, the output of the transistor (Q) has a logical value '0,' and when the transistor (Q) is turned off, the output of the transistor (Q) has a logical value '1.'

The resistor (R) performs a function of a pull-up resistor for allowing the logical value to become '1' when the transistor (Q) is turned off.

As shown in FIGS. 1 and 2, the characteristic code extractor 120 according to an example embodiment of the present invention divides the acoustic source provided by the acoustic source input unit 110 into the signal with the supersonic frequency band and the signal with the audio frequency band by using the HPF 121 and the LPF 123, and extracts a binary code corresponding to the signal with the supersonic frequency band, e.g. a characteristic code corresponding to the audio signal with the audio frequency band ///from the signal with the supersonic frequency band ///by using the binary code extractor 125.

The voice codec 130 converts the signal with the audio frequency band (e.g. an electric signal corresponding to the voice of a sender), which is provided from the LPF 123, to a predetermined format, then provides the converted signal to the controller 140, receives the voice of a voice call partner from the controller 140, converts the received voice to a signal with an audio frequency band, and then provides the converted signal to the speaker 170.

Furthermore, when the portable device regenerates a music file stored in the memory 180 or a music file downloaded via the RF transceiver 150, the voice codec 130 decodes the music file to provide the music file to the speaker 170. When an acoustic source is monitored, the voice codec 130 provides the signal with the audio frequency band provided from the LPF 123 to the speaker 170 under the control of the controller 140.

For example, the RF transceiver 150 can encode or decode a voice by using a codec standard such as G.711, G.723, G.723.1, G.728, etc.

The controller 140 displays a graphic user interface, through which a function for providing an acoustic source information can be selected and performed, via the display 190, and when a key event signal requesting for the selection and execution of the function for providing an acoustic source information is input from the key input 160, the controller 140 receives a characteristic code of an acoustic source input from the characteristic code extractor 120 through the acoustic source input unit 110 and transmits the received characteristic code to an acoustic information server (referring to 200a in FIG. 4) through the RF transceiver 150.

The controller 140 receives information about the acoustic source provided from the acoustic information server (referring to 200a in FIG. 4) through the RF transceiver 150 and displays the information about the acoustic source on the display 190. Also, in case where executable supplementary contents such as web site link information or a download item, etc., are included in the acoustic source information, the controller 140 displays the supplementary contents via the display 190 and executes the supplementary contents according to the key operation of the user.

In addition to the above-described function, the controller 140 performs overall control operations of the portable device.

The RF transceiver 150 receives the characteristic code related to the acoustic source from the controller 140, wirelessly transmits the characteristic code to the acoustic information server via an antenna (ANT), processes the acoustic source information provided from the acoustic information server, and provides the acoustic source information to the controller 140.

In order to perform above operation, the RF transceiver 150 converts a radio frequency (RF) signal received via the ANT to a baseband signal so as to provide the baseband signal to the controller 140, and converts a base band signal provided from the controller 140 to an RF signal so as to wirelessly transmit the RF signal via the ANT.

The key input 160 includes a plurality of character keys, numeric keys, functions keys used for performing special function, and provides a key event signal corresponding to a key operation by the user to the controller 140. Particularly, the key input 160 receives a signal of a key operation such as an operation of selecting and performing a function for providing acoustic source information, and provides a key event signal corresponding to the signal of such key operation to the controller 140. It would be easily understood by those skilled in the art that the key input 160 may be a touch pad or a touch screen which can perform a substantially identified function to the keypad.

The speaker 170 receives the signal with the audio frequency band from the voice codec 130, and outputs the audio signal with the audio frequency band.

The memory 180 temporarily stores a system program and various application programs, such as an operating system, which are used for a basic operation of a portable device, and data generated during the operation of the portable device. Furthermore, the memory 180 can store data generated by the user.

The display 190 is a display device, such as a Liquid Crystal Display (LCD), displays a graphic user interface used for displaying and selecting the function of the portable device under the control of the controller 140, and displays execution screens of various application programs. The display 190 displays information and supplementary contents which are related to an acoustic source under the control of the controller 140.

Although FIG. 1 illustrates the case where an acoustic source input by a microphone, etc. is used as an acoustic source, an audio signal among broadcasting signals can be also used as an acoustic source. For example, an audio signal among digital broadcasting signals such as Digital Audio Broadcasting (DAB), Digital Multimedia Broadcasting (DMB), etc., can be used.

Figure 3:
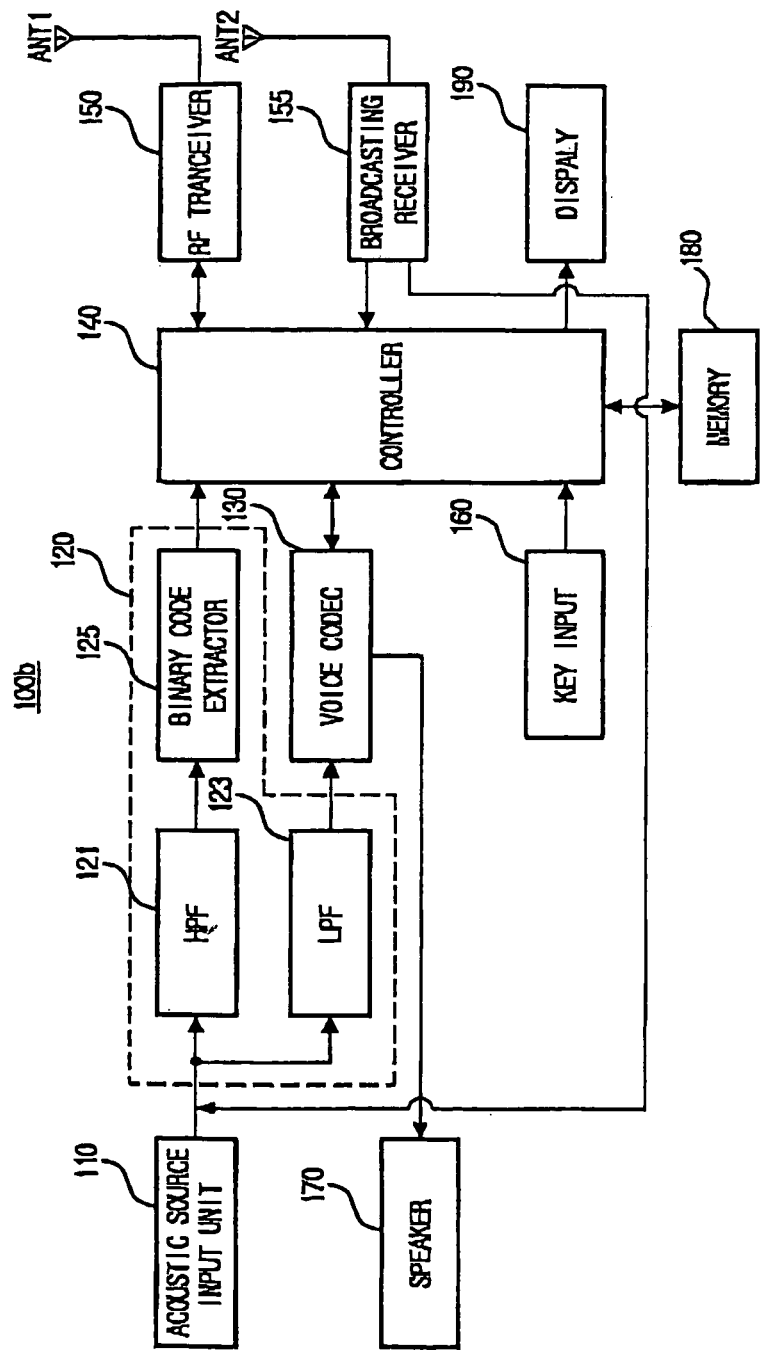
FIG. 3 is a block diagram illustrating a portable device having a function for providing acoustic source information according to another example embodiment of the present invention.

FIG. 3 is a block diagram illustrating a portable device having a function for providing acoustic source information according to another example embodiment of the present invention.

Referring to FIG. 3, a portable device 100b according to another example embodiment of the present invention may further include a broadcasting receiver 155 so as to use an audio signal among broadcasting signals as an outer acoustic source.

The audio signal among broadcasting signals includes a signal with an audio frequency band and a signal with a supersonic frequency band, and the signal with the supersonic frequency band may include a characteristic code used in order to distinguish one signal with the audio frequency band from another audio signal with the audio frequency band.

The broadcasting receiver 155 receives a broadcasting signal via an ANT 2, extracts an audio signal among broadcasting signals, and provides the audio signal to the characteristic code extractor 120.

The characteristic code extractor 120 separates a signal with an audio frequency band and a signal with a supersonic frequency band from the extracted audio signal, and extracts a characteristic code having a binary logic value from the signal with the supersonic frequency band. The descriptions of the function and operation of the remaining elements of the portable device 100b will be omitted since the function and operation of the remaining elements are equal to those of FIG. 1.

In FIGS. 1 and 3, although a mobile communication device is illustrated as an example of a portable device, a method for providing acoustic source information according to one example embodiment of the present invention is not applied only to a mobile communication device, but can be also applied to another type of portable apparatus, such as a Personal Digital Assistant (PDA), a Portable Multimedia Player (PMP), an MP3 player, etc.

Figure 4:
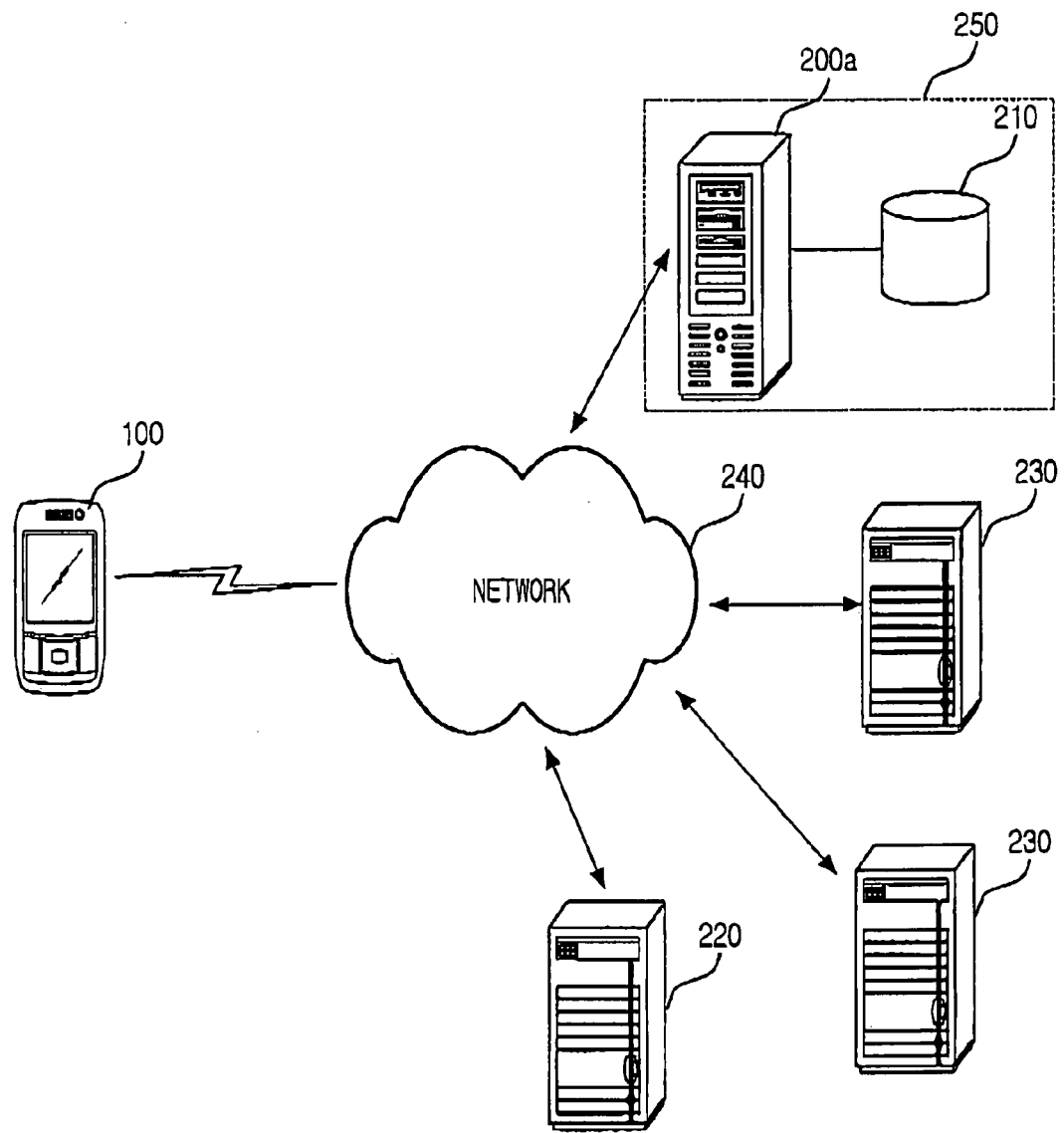
FIG. 4 is a block diagram illustrating a system for providing acoustic source information according to an example embodiment of the present invention.

FIG. 4 is a block diagram illustrating a system for providing acoustic source information according to an example embodiment of the present invention.

Referring to FIG. 4, a system for providing acoustic source information according to an example embodiment of the present invention includes a portable device 100 and an apparatus 250 for providing acoustic source information. The apparatus 250 for providing acoustic source information includes an acoustic information server 200*a* and an acoustic information database 210.

As shown in FIGS. 1 and 2, the portable device 100 extracts a characteristic code from an acoustic source inputted by the acoustic source input unit 110 or from an audio signal of a broadcasting signal received by the broadcasting receiver 155 as shown in FIG. 3, and transmits the extracted characteristic code to the acoustic information server 200*a* via communication network 240. The portable device 100 receives acoustic source information and/or supplementary contents, which are related to the acoustic source, from the acoustic information server 200*a* and displays the acoustic source information and/or supplementary contents.

Furthermore, when the acoustic source information and/or the supplementary contents, which are displayed on the portable device 100, are displayed as web site link information (for example, web site IP address) or as a download item, etc. so as to allow the user to access a web server 220 managed by the acoustic source provider and/or a contents server 230 for providing the supplementary contents related to the acoustic source, it can be possible to access the Web server 220 or the contents server 230 through a key operation by the user, or automatically or in a preset manner.

For example, when, at an environment setting for setting a function for providing acoustic source information, it is preset that the user access the web server 220 managed by the acoustic source provider and/or the contents server 230 managed by the supplementary contents provider, the user can automatically access the corresponding web server 220 and/or the contents server 230 without a key operation.

For example, the communication network 240 may be 2G (2nd Generation) mobile communication network such as asynchronous GSM/GPRS and synchronous IS 95B, 3G (3rd Generation) mobile communication network such as asynchronous WCDMA and HSDPA, synchronous CDMA 2000 1x, Wibro or Mobile Wimax, or 4G (4th Generation mobile communication network. In addition to the mobile communication network, the communication network 240 may include a wire communication network—for example the Internet, etc.—or a wireless communication network such as a wireless LAN, etc.

The portable device can be connected with the acoustic information server via the mobile communication network. Furthermore, the portable device can be connected with the acoustic information server via a wireless Internet.

Also, the portable device can be connected with the acoustic information server through an access point using Wibro or Mobile Wimax. Furthermore, the portable device can be connected with the acoustic information server through an access point using a wireless LAN.

The acoustic information server 200*a* receives a characteristic code related to an acoustic source from the portable device 100 via the communication network 240, searches for acoustic source information corresponding to the characteristic code in the acoustic information database 210, and then transmits the searched acoustic source information to the portable device 100 via the communication network 240.

The acoustic information database 210 stores characteristic codes of various acoustic sources and acoustic source information corresponding to the characteristic codes. The acoustic information database 210 may be separated from the acoustic information server 200*a* or may be included inside the acoustic information server 200*a*.

For example, when an acoustic source is music, the acoustic source information may include a title of the music, a singer(s) of the music, a performance time of the music, a performer of the music, a disc information, a concert information about a singer(s), a homepage link information about the singer(s) and/or a record production of the music, etc. Meanwhile, when an acoustic source is a TV drama, the acoustic source information may include information such as a title of the drama, a plot of the drama, a profile of an actor(s), a name of a writer, a running time, and/or a name of the broadcasting station.

The web server 220 and the contents server 230 may be a server that stores a home page of the company of an acoustic source provider or an acoustic source provider, which is related to predetermined acoustic source, or may be a server that stores supplementary contents corresponding to the predetermined acoustic source and provides the supplementary contents.

The supplementary contents are contents information related to an acoustic source, which are additionally provided by an acoustic source producer or an acoustic source provider. For example, when an acoustic source is music, the supplementary contents may be a downloading of a concert ticket related to the music, a downloading of bell ringing sounds, a discount coupon, etc. Meanwhile, is when an acoustic source is a TV drama, the supplementary contents may be information for introducing the background of the drama, a discount coupon for a travel merchandise coupon, etc.

As shown in FIG. 4, in a system for providing acoustic source information according to an example embodiment of the present invention, the portable device extracts a characteristic code included in an acoustic source so as to transmit the extracted characteristic code to the acoustic information server 200*a*. The acoustic information server 200*a* searches for acoustic source information corresponding to the characteristic code in the acoustic information database 210 so as to transmit the searched acoustic source information to the portable device 100.

Therefore, the acoustic information server 200*a* does not store acoustic sources nor performs separate process for the acoustic sources, but can provide acoustic source information related to various acoustic sources to the portable device 100 therefore, the acoustic information server may simply provide acoustic source information to the portable device, and the load of the acoustic information server may be reduced.

Figure 5:
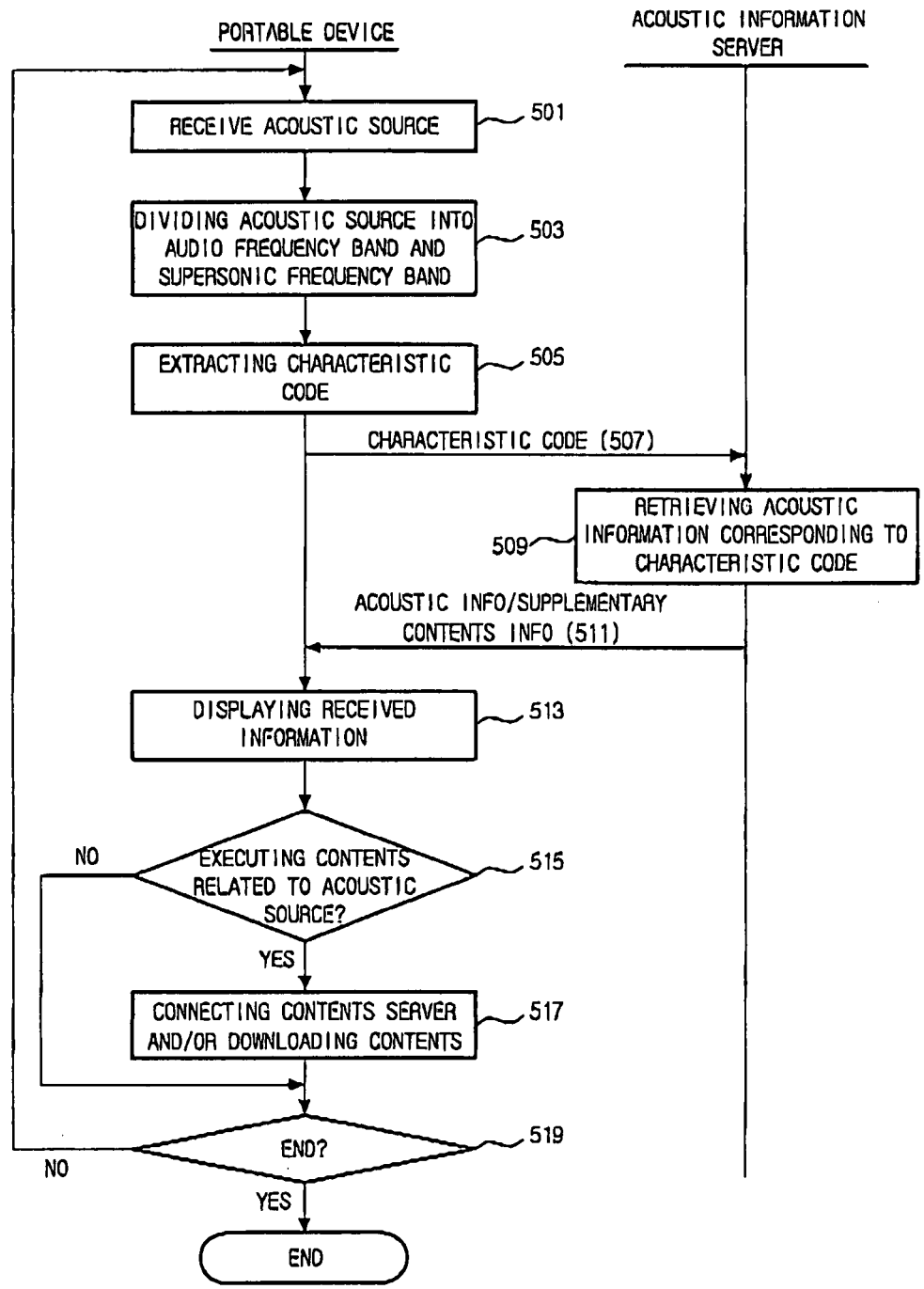
FIG. 5 is a flow chart illustrating a method for providing acoustic source information according to an example embodiment of the present invention.

FIG. 5 is a flow chart illustrating a method for providing acoustic source information according to an example embodiment of the present invention. It is assumed that the portable device is initialized, and an acoustic source information is provided in response to a key operation of the user.

Referring to FIG. 5, when an acoustic source information providing process starts, the portable device receives an outer acoustic source (step 501). The acoustic source includes an audio signal with an audio frequency band and a signal with a supersonic frequency band. There is an one to one correspondence between the audio signal with the audio frequency band and the signal with a supersonic frequency band.

The received acoustic source is divided into an audio signal with an audio frequency band and a signal with a supersonic frequency band (step 503).

The portable device extracts a characteristic code from the signal with the supersonic frequency band (step 505). The characteristic code may have a binary logical value, and there is one to one correspondence between the characteristic code and the audio signal with the audio frequency band, so that the characteristic code can be used for distinguishing one audio signal with the audio frequency band from another audio signal with the audio frequency band.

The portable device transmits the extracted characteristic code to the acoustic information server 200a via the communication network 240 (step 507).

The acoustic information server 200a receives the characteristic code of the acoustic source from the portable device and searches for acoustic source information corresponding to the characteristic code in the acoustic information database (step 509). Then, the acoustic information server 200a transmits the searched acoustic source information and/or supplementary contents information to the portable device via the communication network in step 511.

The portable device receives the acoustic source information and/or the supplementary contents information corresponding to the transmitted characteristic code from the acoustic information server 200a and displays the received acoustic source information and/or supplementary contents information by the display 190 (step 513).

The portable device checks whether a key event signal demanding execution of the displayed acoustic source information and/or supplementary contents is inputted or not, and determines whether supplementary contents related to the acoustic source are executed or not (step 515). When it has been determined that the key event signal is inputted, the portable device performs a process corresponding to the key event signal. For example, the portable device can perform a process so as to allow the user to access a contents server or a web server of the producer or the acoustic source provider in response to the key event signal, and when supplementary contents which can be downloaded are displayed on the graphic user interface of the portable device, the portable device can download the displayed supplementary contents according to a key input from the user (step 517).

The portable device checks whether a key event signal demanding an end of a function for providing acoustic source information is inputted or not (step 519). When it has been checked that the key event signal is inputted, the portable device ends the function for providing acoustic source information according to an example embodiment of the present invention. On the other hand, when it has been checked that the key event signal is not inputted, the portable device returns to step 501 and sequentially performs following steps.

Although in the above-described embodiments, the operation for extracting the characteristic code from an acoustic source is performed in the portable device, in another example embodiment of the present invention, the acoustic information server can receive an acoustic source from the portable device, extract a characteristic code, search for acoustic source information corresponding to the characteristic code, and transmit the searched acoustic source information to the portable device.

Figure 6:
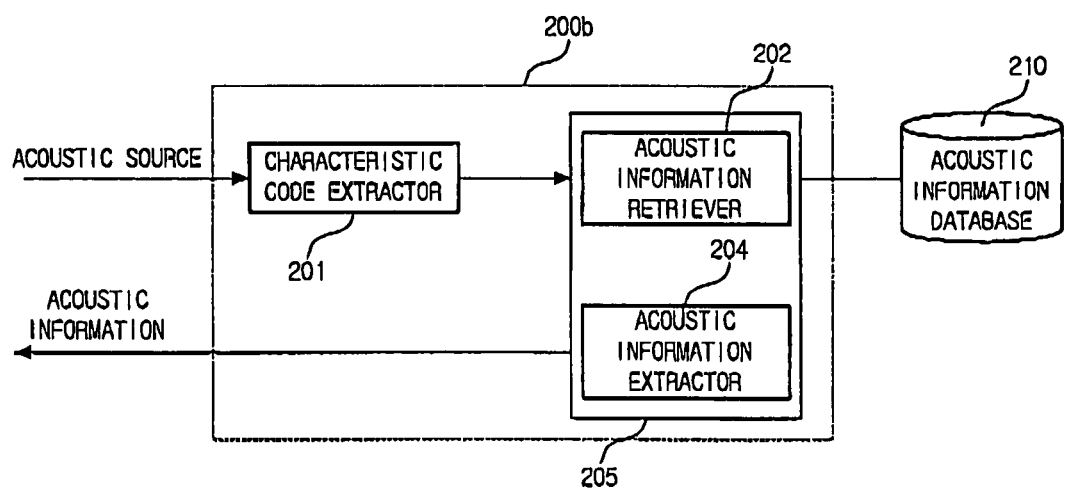
FIG. 6 is a block diagram illustrating an apparatus for providing acoustic source information according to another example embodiment of the present invention.
Figure 7:
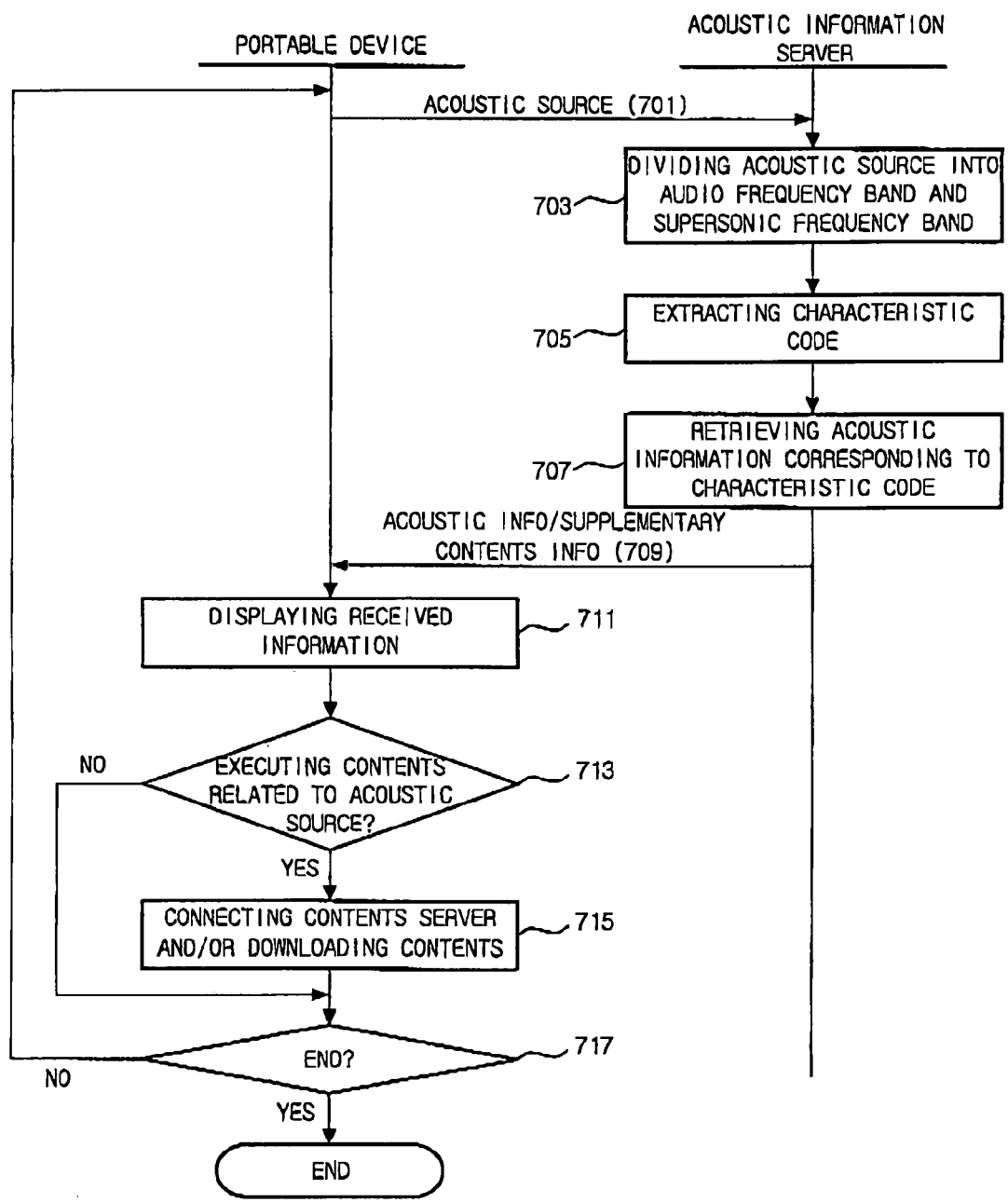
FIG. 7 is a flow chart illustrating a method for providing acoustic source information according to another example embodiment of the present invention.

FIG. 6 is a block diagram illustrating an apparatus for providing acoustic source information according to another example embodiment of the present invention, and FIG. 7 is a flow chart illustrating a method for providing acoustic source information according to another example embodiment of the present invention.

Regarding to FIG. 6, the apparatus for providing acoustic source information includes an acoustic information server 200b and an acoustic information database 210. The acoustic information server 200b includes a characteristic code extractor 201 and a controller 205. The detailed description of the construction of the characteristic code extractor 201 is omitted since the construction of the characteristic code extractor 201 of FIG. 6 is equal to the construction of the characteristic code extractor 201 of FIG. 1.

The characteristic code extractor 201 of the acoustic information server 200b receives an acoustic source composed of a signal with a supersonic frequency band and an audio signal with an audio frequency band, and extracts a characteristic code corresponding to the signal with the supersonic frequency band. The acoustic information searching unit 202 searches for acoustic source information corresponding to the extracted characteristic code in the acoustic information database 210.

The acoustic information extractor 204 reads the searched acoustic source information from the acoustic information database 210 and transmits the read acoustic source information to the portable device.

Hereinafter, with reference to FIGS. 6 and 7, a method for providing acoustic source information according to another example embodiment of the present invention will be described.

Referring to FIGS. 6 and 7, the portable device receives an outer acoustic source and transmits the outer acoustic source to the acoustic information server (step 701). The acoustic source includes an audio signal with an audio frequency band and a signal with a supersonic frequency band. There is one to one correspondence between the signal with a supersonic frequency band and the audio signal with the audio frequency band one to one.

The acoustic information server 200b divides the acoustic source received from the portable device into a signal with a supersonic frequency band and an audio signal with an audio frequency band (step 703).

The acoustic information server 200b extracts a characteristic code from the signal with the supersonic frequency band (step 705). The characteristic code may have a binary logic value, and there is one to one correspondence between the characteristic code and the audio signal with the audio frequency band so that the characteristic code can be used for distinguishing one audio signal with the audio frequency band from another audio signal with the audio frequency band.

The acoustic information server 200b searches for acoustic source information corresponding to the characteristic code in the acoustic information database 210 by using the characteristic code (step 707). Then, the acoustic information server 200b transmits the searched acoustic source information and/or supplementary contents to the portable device via a communication network (step 709). The descriptions of steps 711 through 717 corresponding to steps 513 through 519 of FIG. 5 will be omitted since steps 711 through 717 perform operation equal to the operation performed in steps 513 through 519.

Although example embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A portable device having a function for providing an acoustic source information, comprising:

a characteristic code extractor configured to receive an acoustic source to divide the acoustic source into an audio signal with an audio frequency band and a signal with a supersonic frequency band, the characteristic code extractor extracting a characteristic code of the audio signal with the audio frequency band from the signal with the supersonic frequency band; and a controller configured to transmit the characteristic code to an acoustic information server, and configured to output the acoustic source information corresponding to the characteristic code that is provided from the acoustic information server, wherein the acoustic source includes the audio signal with the audio frequency band and the signal with the supersonic frequency band having the characteristic code used for distinguishing one audio signal with the audio frequency band from another audio signal with the audio frequency band, wherein the characteristic code extractor includes:
 a high pass filter for separating the signal with the supersonic frequency band from the acoustic source; and
 a binary code extractor for extracting the characteristic code having a binary logic value from the signal with the supersonic frequency band,
 wherein the binary code extractor includes a transistor (Q) having an emitter, a base, and a collector node and a resistor (R) connected between the collector node of the transistor (Q) and a power source (Vcc).

2. The portable device as claimed in claim 1, wherein the signal with the supersonic frequency band may be in a range from about 20 kHz to about 50 kHz.

3. The portable device as claimed in claim 1, wherein the acoustic source information includes supplementary contents information related to the acoustic source.

4. The portable device as claimed in claim 1, further comprising an acoustic source input unit for receiving the acoustic source.

5. The portable device as claimed in claim 1, further comprising a broadcasting receiver for receiving a digital broadcasting signal via an antenna to provide an audio signal of the digital broadcasting signal to the characteristic code extractor.

6. The portable device as claimed in claim 5, wherein the audio signal of the digital broadcasting signal includes a first signal with the audio frequency band and a second signal with the supersonic frequency band having a characteristic code used for distinguishing the first signal with the audio frequency band from another audio signal with the audio frequency band.

7. An apparatus for providing an acoustic source information, comprising:
 a characteristic code extractor configured to receive an acoustic source from a portable device, configured to search for the acoustic source information corresponding to the characteristic code of the acoustic source, and configured to provide the searched acoustic source information to the portable device,
 wherein the acoustic source includes an audio signal with an audio frequency band and a signal with a supersonic frequency band, and the characteristic code of the acoustic source is used for distinguishing one audio signal with the audio frequency band from another audio signal with the audio frequency band,
 wherein the characteristic code extractor includes:
  a high pass filter for separating the signal with a supersonic frequency band from the acoustic source; and
  a binary code extractor for extracting the characteristic code having a binary logic value from the signal with the supersonic frequency band,
  wherein the binary code extractor includes a transistor (Q) having an emitter, a base, and a collector node and a resistor (R) connected between the collector node of the transistor (Q) and a power source (Vcc).

8. The apparatus as claimed in claim 7, comprising:
 an acoustic information database configured to store the acoustic source information corresponding to the characteristic code of the acoustic source; and
 an acoustic information server configured to receive the characteristic code of the acoustic source from the portable device, configured to search for the acoustic source information corresponding to the characteristic code of the acoustic source in the acoustic information database, and configured to provide the searched acoustic source information to the portable device.

9. The apparatus as claimed in claim 7, wherein the acoustic source information server provides supplementary contents information related to the acoustic source to the portable device.

10. A method of providing an acoustic source information in a portable device, comprising:
 receiving an acoustic source including an audio signal with an audio frequency band and a signal with a supersonic frequency band; and
 extracting a characteristic code of the audio signal with the audio frequency band from the signal with the supersonic frequency band,
 wherein the acoustic source includes the audio signal with the audio frequency band and the signal with the supersonic frequency band, and the characteristic code of the acoustic source is used for distinguishing one audio signal with the audio frequency band from another audio signal with the audio frequency band,
 wherein the extracted characteristic code is extracted via:
 a high pass filter for separating the signal with the supersonic frequency band from the acoustic source; and
 a binary code extractor for extracting the characteristic code having a binary logic value from the signal with the supersonic frequency band,
 wherein the binary code extractor includes a transistor (Q) having an emitter, a base, and a collector node and a resistor (R) connected between the collector node of the transistor (Q) and a power source (Vcc).

11. The method as claimed in claim 10, further comprising:
 transmitting the characteristic code to an acoustic information server via a communication network; and
 outputting the acoustic source information corresponding to the characteristic code received from the acoustic source information server via the communication network.

12. The method as claimed in claim 11, further comprising:
executing supplementary contents information when the acoustic source information includes the supplementary contents information.

13. The method as claimed in claim 11, further comprising dividing the acoustic source into the signal with the supersonic frequency band and the audio signal with the audio frequency band.

14. A method for providing an acoustic source information in an apparatus for providing the acoustic source information to a portable device, the method comprising:
 receiving a characteristic code of an acoustic source from the portable device;

searching for the acoustic source information corresponding to the characteristic code of the acoustic source; and providing the searched acoustic source information to the portable device, wherein the acoustic source includes an audio signal with an audio frequency band and a signal with a supersonic frequency band, and the characteristic code of the acoustic source is used for distinguishing one audio signal with the audio frequency band from another audio signal with the audio frequency band, wherein the characteristic code is extracted via:

a high pass filter for separating the signal with the supersonic frequency band from the acoustic source; and a binary code extractor for extracting the characteristic code having a binary logic value from the signal with the supersonic frequency band, wherein the binary code extractor includes a transistor (Q) having an emitter, a base, and a collector node and a resistor (R) connected between the collector node of the transistor (Q) and a power source (Vcc).

15. The method as claimed in claim 14, wherein the acoustic source includes the audio signal with the audio frequency band and the signal with the supersonic frequency band, and the characteristic code of the acoustic source is used for distinguishing one audio signal with the audio frequency band from another audio signal with the audio frequency band.

16. The method as claimed in claim 14, wherein the searching for the acoustic source information corresponding to the characteristic code of the acoustic source comprises:

providing a database including at least one acoustic source information corresponding to a predetermined characteristic code; and searching for the acoustic source information corresponding to the characteristic code of the acoustic source in the database.

17. A method for providing an acoustic source information in an apparatus for providing the acoustic source information to a portable device, the method comprising:

receiving an acoustic source including a signal with a supersonic frequency band and an audio signal with an audio frequency band from the portable device;

extracting a characteristic code of the audio signal with the audio frequency band from the signal with the supersonic frequency band;

searching for the acoustic source information corresponding to the characteristic code; and providing the searched acoustic source information to the portable device, wherein the acoustic source includes the audio signal with the audio frequency band and the signal with the supersonic frequency band, and the characteristic code of the acoustic source is used for distinguishing one audio signal with the audio frequency band from another audio signal with the audio frequency band, wherein the extracted characteristic code is extracted via:

a high pass filter for separating the signal with the supersonic frequency band from the acoustic source; and a binary code extractor for extracting the characteristic code having a binary logic value from the signal with the supersonic frequency band, wherein the binary code extractor includes a transistor (Q) having an emitter, a base, and a collector node and a resistor (R) connected between the collector node of the transistor (Q) and a power source (Vcc).

* * * * *